United States Patent [19]

Nathaniel et al.

[11] 4,438,003

[45] Mar. 20, 1984

[54] SKATING SURFACE

[76] Inventors: Elmer O. Nathaniel, 9178 Villaridge, St. Louis, Mo. 63123; John Eibert, Jr., 1076 Humber Cir., St. Louis, Mo. 63129

[21] Appl. No.: 935,485

[22] Filed: Aug. 21, 1978

Related U.S. Application Data

[63] Continuation of Ser. No. 850,953, Nov. 14, 1977, which is a continuation of Ser. No. 751,607, Dec. 17, 1976, abandoned, which is a continuation of Ser. No. 652,802, Jan. 27, 1976, abandoned, which is a continuation of Ser. No. 508,985, Sep. 25, 1974, abandoned.

[51] Int. Cl.$^3$ ............................................. C10M 7/14
[52] U.S. Cl. ......................................... 252/12; 272/3; 272/56.5 SS
[58] Field of Search ................ 272/1 B, 3, 15, 56.5 R, 272/56.5 SS, 70; 273/1 B; 62/235; 252/49.3, 49.5, 52 R, 12; 239/2 S

[56] References Cited

U.S. PATENT DOCUMENTS

| | | | |
|---|---|---|---|
| 2,008,939 | 7/1935 | Tufts | 252/49.3 X |
| 2,982,547 | 5/1961 | Carrier | 272/56.5 R |
| 3,000,826 | 9/1961 | Gililland | 252/49.3 |
| 3,062,671 | 11/1962 | Kaupp et al. | 252/52 R UX |
| 3,364,143 | 1/1968 | Johnson | 252/49.5 |
| 3,372,872 | 3/1968 | Le Bus et al. | 239/2 S |
| 3,407,713 | 10/1968 | Heckman | 272/70 |
| 3,427,934 | 2/1969 | Zames | 272/70 |
| 3,497,211 | 2/1970 | Nagin | 272/56.5 SS |
| 3,508,945 | 4/1970 | Haemer et al. | 272/3 UX |
| 3,607,603 | 9/1971 | Coverdale, Jr. | 272/56.5 R |
| 3,610,527 | 10/1971 | Ericson et al. | 239/2 S |
| 3,657,123 | 4/1972 | Stram | 252/49.5 X |
| 3,740,352 | 6/1973 | Sommers | 252/49.3 X |
| 3,897,904 | 8/1975 | Kiegerl | 239/2 S X |

FOREIGN PATENT DOCUMENTS

| | | | |
|---|---|---|---|
| 683359 | 2/1930 | France | 252/52 R |
| 513310 | 11/1971 | Switzerland | 272/3 |
| 995708 | 6/1965 | United Kingdom | 252/49.3 |

*Primary Examiner*—Richard T. Stouffer
*Attorney, Agent, or Firm*—Kalish & Gilster

[57] ABSTRACT

A surface for ice skating purposes comprised of a multiplicity of discrete flat components formed of extruded resinous material with the same being edgewise interlocked. A lubricant of water and a glycol is applied to said surface for heat dissipation purposes, and promoting slickness.

1 Claim, No Drawings

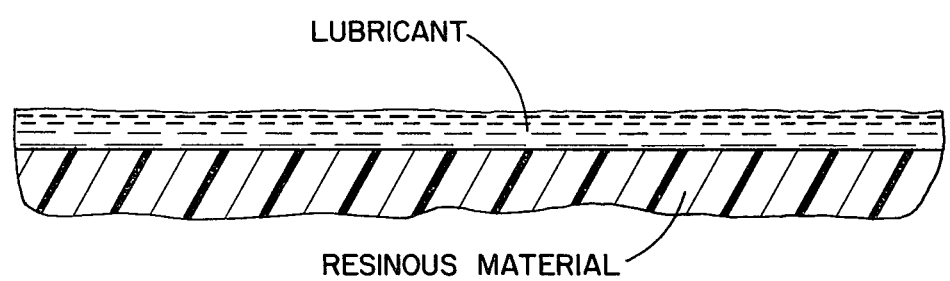

SKATING SURFACE

This is a continuation of application Ser. No. 850,953 filed Nov. 14, 1977, which is a continuation of application Ser. No. 751,607 filed Dec. 17, 1976, now abandoned, which is a continuation of application Ser. No. 652,802 filed Jan. 27, 1976, now abandoned, and which is a continuation of application Ser. No. 508,985 filed Sept. 25, 1974, now abandoned.

BACKGROUND AND SUMMARY OF THE INVENTION

This invention relates in general to the sport of ice skating and, more particularly, to a surface for such purpose.

Heretofore, the only suitable surfaces for ice skating have been those of refrigerated character, as well as naturally formed ice in ponds and the like. However, due to the expense of installation and maintenance, refrigerated ice skating surfaces have necessarily only found usage in urbanized areas providing a volume of admissions commensurate with the investment and expenses involved. Efforts to the present time to develop a non-refrigerated skating surface have consistently proved fruitless.

Therefore, it is an object of the present invention to provide a non-refrigerated surface suitable for accepting ice skates in a manner substantially equivalent to ice.

It is another object of the present invention to provide a skating surface which may be substantially preformed thereby obviating the necessity for costly installation services and permitting of the establishment of the surface for usage by relatively unskilled individuals.

It is a further object of the present invention to provide a skating surface of a non-refrigerated character which may be composed of a preselected number of integrated components thereby permitting of skating areas of predetermined extent so that the developed surface may accommodate the available space.

It is a further object of the present invention to provide a non-refrigerated skating surface which does not necessitate an especially prepared foundation but which may be readily laid out upon any flat, plane surface regardless of constitution; which is wear resistant; which may be most economically manufactured and maintained; and which may be utilized both outdoors and indoors.

It is a still further object of the present invention to provide a skating surface which may be disassembled and easily stored during any periods of disuse; as well as permitting of facile transportability of the same.

GENERAL STATEMENT OF THE INVENTION

It is within the contemplation of the present invention to provide a surface for use by ice skaters which is constituted of a multiplicity of interengaged flat components or units formed as by extrusion from resinous material. The said components being disposed upon a flat surface and with the upper face thereof being then treated with a lubricant, applied, as by spraying. The said lubricant may be applied periodically during the period of use of the surface, which latter has the desired extent of "give" or limited deformability to provide the users with substantially the same use characteristics and sensations as are encountered when skating upon a refrigerated, frozen surface.

DESCRIPTION OF THE INVENTION

By the present invention there is provided a skating surface comprised of a preselected number of discrete components, each being of like shape and size for economic production and with the same being of flat, sheet-like character having a thickness of approximately ¼", and an area of any predetermined extent, desirably commensurate with ease of handling. Thus, in actual practice, such components have been of generally four-sided character and being of 1'×1' or 2'×2' dimensions, although obviously the generally square form is not critical. The edge portions of each component are of zig-zag or like alternating ridge and valley character for interlocking relationship with the confronting edge of the adjacent components for thereby developing the resultant surface.

It is to be understood that the aforesaid dimensions and thickness are preferred since the same conduce both to economy in production, as well as facile handling for shipping, storing, assembling and disassembling purposes.

The said components are formed by extrusion from high density polyethylene and may also be formed from polypropylene, as well as fluorinated polyethylene.

In developing the skating surface the said components may be disposed upon any suitable support area, whether the same be formed of wood, concrete, carpeting or the like; the only necessity being that the same be flat, in order that the skating surface will likewise be planar to assure of the absence of any unevenness, as well as appropriate interlock between the individual components.

Although it is evident that a skating surface of the type under discussion may be obtained from components having smooth, rectilinear edges, such has not been found preferable in practice since any contraction due to ambient conditions would tend to enlarge the joint between adjacent components and thus promote a skating hazard, while with the interlock as above described, separation of adjacent components by virtue of conditions causing contraction would be obviated.

After the components have been disposed upon the support area in surface formation there is applied upon the upwardly directed face of such surface a lubricant which comprises approximately one part by volume of a water soluble glycol and three parts by volume of water. Glycerin, or glycerol, has proved particularly suitable for formation of the lubricant, although other water soluble glycols, such as ethylene glycol, butylene glycol, propylene glycol, diethylene glycol, trimethylene glycol, tetramethylene glycol, pentamethylene glycol, and the like are equally suitable. It is requisite that such compounds have a relatively high boiling point so as to avoid evaporation; be water soluble; provide the desired slickness to the surface treated, and possess the capacity for water retentivity. The lubricant, as stated, is applied preferably by spraying, as from a conventional spray gun, so as to form a mist which settled upon the surface of the components, with the spraying being desirably effected roughly one to two feet above the said surface. The lubricant will form a light film which serves to protect the surface against heating from the skate blades, as well as to protect the surface against cutting. Thus, the lubricant serves to dissipate the heat created by the friction developed between the blades and the surface.

The resultant surface has been found to very closely simmulate, from the standpoint of a skater, the properties of a refrigerated surface; with the same having been accorded a 90 percent efficiency in comparison. The resinous components possess the desired degree of "give" without being elastic so as to both resist the pressure of the skate blades to prevent damage, as well as to permit of a smooth skating or gliding action as provided by refrigerated surfaces.

Thus, the said material uniquely comprehends both the desired hardness, as well as the property of limited deformability. It is to be recognized that the lubricant is nontoxic and maintains the surface in a cool state, inhibiting undesired heat buildup.

The surface of the present invention may be utilized within an ambient temperature range of 40°-80° with about 60° being preferred. Consequently, the said surfaces are adaptable for indoor, as well as outdoor use, but with the latter being in seasons when ice skating is normally not provided.

Accordingly, in view of the foregoing, it is apparent that the present invention is indeed unique, providing a surface for ice skates which is both durable and economic and which does not require costly preparatory measure for installation so that the same can be used within any available area and within zones of limited population which have been unable heretofore to support a refrigerated surface.

Having described our invention, what we claim and desire to obtain by Letters Patent is:

1. A flat non-refrigerated surface-forming member for ice skating purposes formed of resinous material in the class consisting of high density polyethylene, polypropylene and fluorinated polyethylene, and a lubricant provided upon said member and forming a film thereon, said lubricant being a solution consisting essentially of approximately three parts by volume of water and approximately one part by volume of a water soluble agent from the class consisting of glycerin, ethylene glycol, butylene glycol, propylene glycol, diethylene glycol, trimethylene glycol, tetramethylene glycol, and pentamethylene glycol.

* * * * *